United States Patent [19]

Lee

[11] 4,297,738
[45] Oct. 27, 1981

[54] APPARATUS FOR AND METHOD OF DETECTING HIGH IMPEDANCE FAULTS ON DISTRIBUTION CIRCUITS WITH DELTA CONNECTED LOADS

[75] Inventor: Ilyoul Lee, Pacific Palisades, Calif.

[73] Assignee: Electric Power Research Institute, Inc., Palo Alto, Calif.

[21] Appl. No.: 89,202

[22] Filed: Oct. 29, 1979

[51] Int. Cl.³ .............................................. H02H 3/16
[52] U.S. Cl. ....................................... 361/42; 361/47; 361/93
[58] Field of Search ...................... 361/42, 93, 94, 98, 361/113, 86, 87, 47–50; 324/78 F; 340/661

[56] References Cited

U.S. PATENT DOCUMENTS 3,308,345  3/1967  Warrington ...................... 361/113
3,515,943  6/1970  Warrington ...................... 340/661
4,196,463  4/1980  Dickerson ......................... 361/113

FOREIGN PATENT DOCUMENTS 470885  10/1975  U.S.S.R. ............................ 361/113

Primary Examiner—Harry E. Moose, Jr.
Attorney, Agent, or Firm—Flehr, Hohbach, Test

[57] ABSTRACT

A technique for detecting high impedance faults on distribution circuits with delta connected loads is disclosed herein. This technique bases its detection on the status of the third harmonic component in each of the three-phase line currents of the distribution circuit and specifically on a predetermined minimum increase in the amplitude of any one of these components over a continuous predetermined period, whereby to discriminate between a true high impedance fault and a transient disturbance.

6 Claims, 12 Drawing Figures

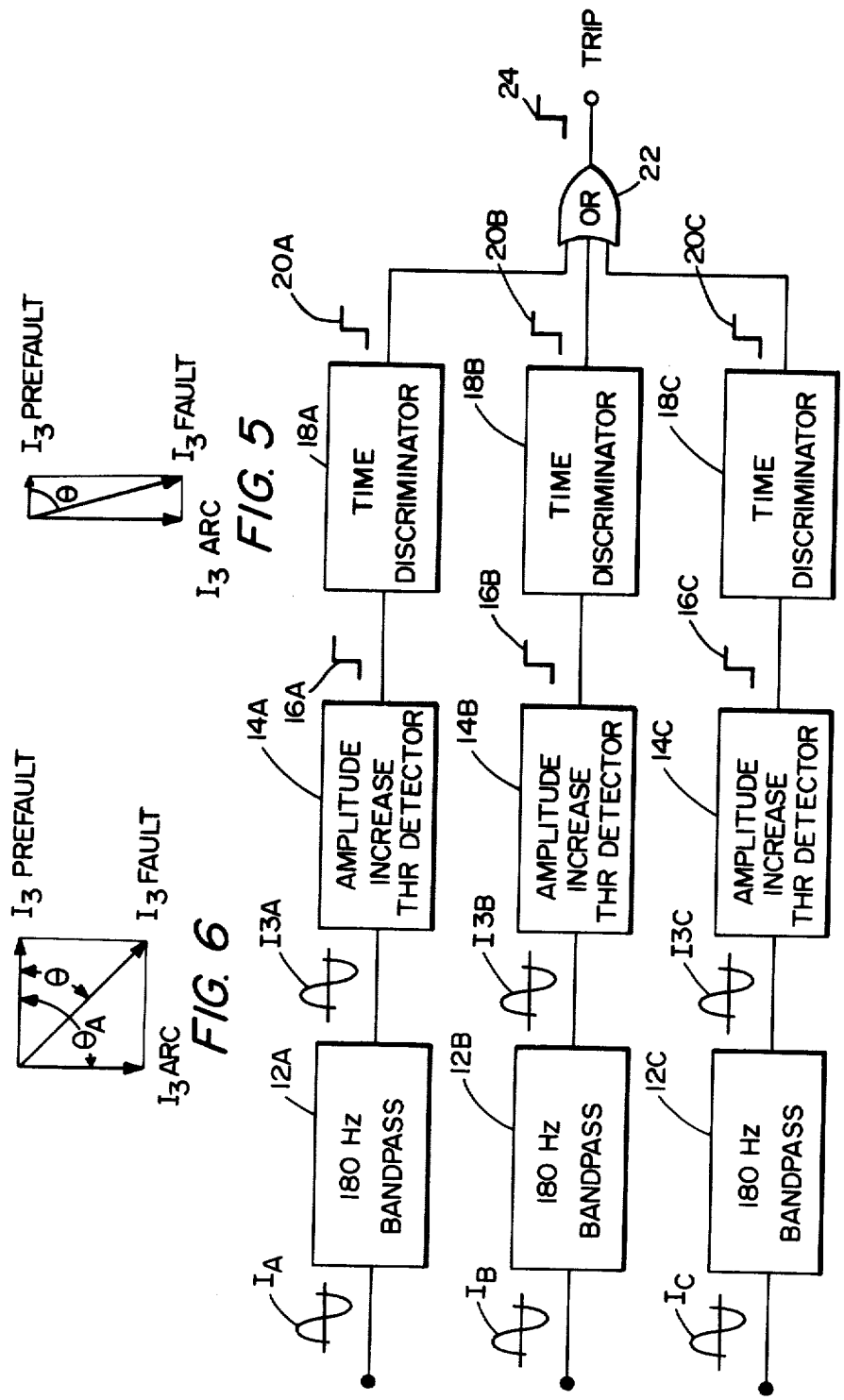

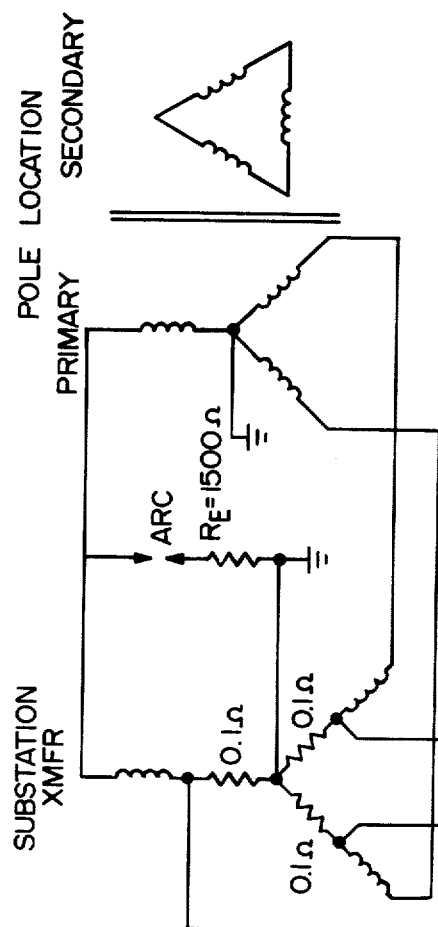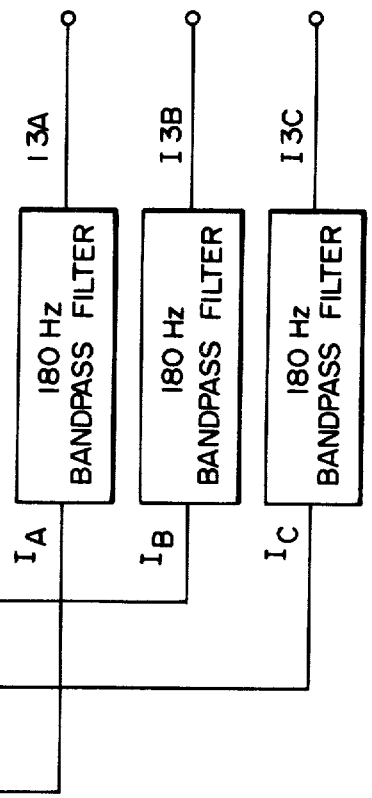
FIG. 8

APPARATUS FOR AND METHOD OF DETECTING HIGH IMPEDANCE FAULTS ON DISTRIBUTION CIRCUITS WITH DELTA CONNECTED LOADS

The present invention relates generally to a technique for detecting high impedance faults in electrical distribution circuits and more particularly to a technique for detecting such faults on distribution circuits with delta connected loads by monitoring the amplitude of the third harmonic current components of the line currents in the distribution circuit.

A high impedance fault is defined herein to include a broken phase conductor which may or may not contact ground or an intact phase conductor contacted by a high impedance path to ground. This definition is valid for the three-phase distribution circuit with delta connected load as well as a solidly grounded, wye connected three-phase distribution circuit, the latter of which is the subject of Applicant's copending U.S. patent application, Ser. No. 89,203, filed Oct. 29, 1979 entitled HIGH IMPEDANCE FAULT DETECTION ON POWER DISTRIBUTION CIRCUITS. The three-phase distribution circuit with delta connected load for purposes of the present invention is one which includes at least one delta connection comprising part of the circuit, e.g., a delta connected primary, a delta connected secondary or both. Heretofore, the clearing of distribution line faults has typically been accomplished by a device which senses the overcurrent produced by the fault. However, a high impedance to ground path can limit the fault current to values which are below the treshold of operation of such a device and thus the fault condition persists.

One suggested way of detecting high impedance faults other than by sensing overcurrent directly is disclosed in U.S. Pat. No. 3,308,345. There, a technique is provided for monitoring the amplitude of the combination of high harmonic components of the line currents. Applicant has not found this general technique to be satisfactory with either wye or delta connected circuits, although the utilization of the phase relationship between the third harmonic current components specifically is the subject of his copending application cited above. There, a technique is disclosed for detecting high impedance faults on a solidly grounded, wye connected three-phase distribution circuit by sensing for a delay in the phase of one of the third harmonic components, e.g. the one associated with the fault during a period when the phase of each of the other two harmonic components remains unchanged. While this technique is quite advantageous for use specifically with solidly grounded, wye connected three-phase distribution circuits, it has not been found satisfactory for detecting similar faults on distribution circuits with delta connected leads because the amplitude of the third harmonic current circuit is near the system noise level and both phase and amplitude variations are too frequent thereby resulting in an intolerable rate of false alarms. Still another suggested way of detecting high impedance faults other than by sensing overcurrent directly is disclosed in U.S. Pat. No. 3,515,943. There, the total harmonic components other than the 60 Hz are used for detection. However, this technique does not work well in real power systems with either wye or delta connected circuits because the total harmonic-current increases is not large enough to differentiate from contribution from system contributed harmonics.

In an attempt to overcome the foregoing problems, Applicant discovered a specific relationship between high impedance faults on three-phase distribution circuits with delta connected loads and the change of amplitude between the third harmonic components of the line currents in this circuit prior to and during such a fault. More specifically, Applicant discovered that the amplitude increase of the third harmonic current component increases significantly (ten to twenty times) from its prefault level so as to be readily detectable over and above normal system disturbances. This is to be contrasted with the change in amplitude of the third harmonic component from its prefault to its fault level in a solidly grounded wye connected circuit. There, the increase is not nearly as significant and, in fact, in most cases, the increase is not readily detectable over and above normal system disturbances.

In view of the foregoing, one object of the present invention is to provide an uncomplicated and yet reliable technique of monitoring for high impedance faults on delta connected distribution circuits while, at the same time, discriminating between such faults and some of the normal system disturbances.

Another object of the present invention is to provide the foregoing technique by monitoring the amplitude relationship of each of the third harmonic current components in the three-phase line currents of the distribution circuit prior to and during the high impedance fault.

Still another object of the present invention is to provide a specific apparatus for and method of monitoring the amplitude of the third harmonic components just mentioned so as to indicate in an uncomplicated and reliable way when any one thereof exceeds a predetermined threshold level over a continuous predetermined period of time (one to two seconds).

As will be described in more detail hereinafter, the specific technique disclosed herein is one which detects high impedance faults in three-phase distribution circuits with delta connected loads by first providing the third harmonic current components from each of the three-phase line currents in the distribution circuit. These components are monitored for the presence of a predetermined minimum increase in amplitude and an appropriate output signal is produced in response to the presence of such an increase in any one of the components for a continuous predetermined period of time. This output signal serves to indicate the presence of a high impedance fault on the line associated with the prolonged, abnormally high amplitude third harmonic current component.

A more detailed description of the overall fault detecting technique disclosed herein and just described generally will be provided hereinafter in conjunction with the drawings wherein.

Figure 2A:
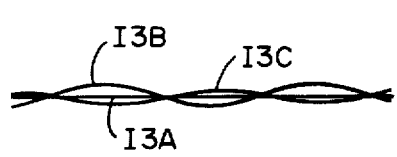
Figure 2B:
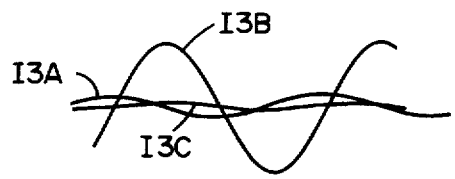
Figure 3A:
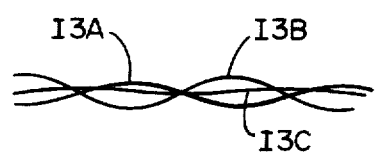
Figure 3B:
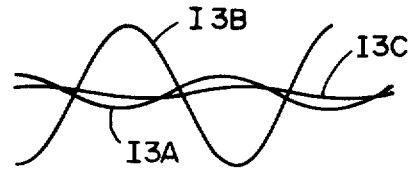
Figure 4A:
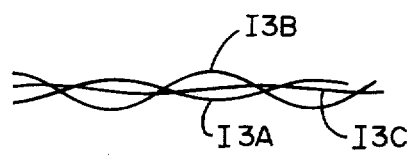
Figure 4B:
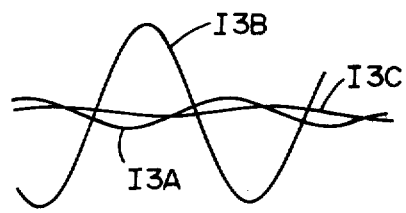

FIGS. 2A and 2B respectively illustrate the third harmonic current component in each line of a three-phase distribution circuit with a transformer bank having an ungrounded wye connected primary and a delta secondary connection during a non-fault and a high impedance fault period;

FIGS. 3A and 3B are illustrations respectively similar to FIGS. 2A and 2B in a three-phase distribution circuit with a transformer bank having a delta connected primary and a delta connected secondary;

FIGS. 4A and 4B are illustrations respectively similar to FIGS. 2A and 2B in a three-phase distribution circuit with a transformer bank having a delta connected primary and an ungrounded wye connected secondary;

FIG. 5 is a diagrammatic illustration of the vectors associated with the amplitude of a third harmonic component in a three-phase distribution circuit with delta connected loads prior to and during the presence of a high impedance;

FIG. 6 is a view similar to FIG. 5 in a solidly grounded, wye connected three-phase distribution circuit;

FIG. 7 is a block diagram of an apparatus which is designed in accordance with the present invention for detecting high impedance faults on a delta connected three-phase distribution circuit; and FIG. 8 schematically illustrates a simulated, simple three-phase distribution line using small single phase transformers.

Figure 1A:
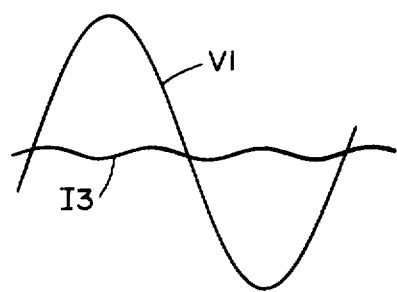
FIG. 1A illustrates the line voltage and the third harmonic current component in one line of a three-phase distribution circuit with a transformer bank having a grounded wye primary connection and a delta secondary connection during a non-fault period, that is, during the absence of a high impedance fault or transient disturbance which might be mistaken for such a fault.
Figure 1B:
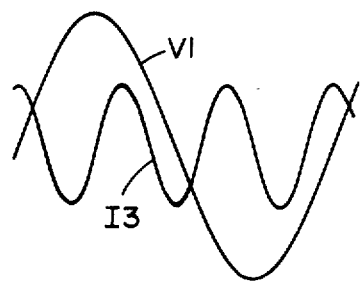
FIG. 1B illustrates the line voltage and third harmonic component in the same circuit as FIG. 1A but during a high impedance fault.

Turning now to the drawings, attention is first directed to FIG. 1A which illustrates the sinusoidal line voltage V1 and third harmonic current component I3 in one line of a three-phase distribution circuit with a transformer bank having a grounded wye connected primary and a delta secondary connection during a prefault period, that is, during absence of a high impedance fault or transient disturbance which might be mistaken for a fault. Note that the amplitude of third harmonic component I3 is relatively small. This amplitude should be contrasted with the amplitude of the same third harmonic current component shown in FIG. 1B during the presence of a high impedance fault. As shown in this latter figure, the amplitude increases significantly relative to its prefault amplitude.

Referring now to FIG. 2A, the third harmonic current components from all three lines in a three-phase distribution circuit with a transformer bank having an ungrounded wye connected primary and a delta connected secondary is shown during a prefault period. It can be seen there that all three current components (generally designated at I3A, I3B and I3C) have relatively small amplitudes. FIG. 2B illustrates the same three current components during a period when a high impedance fault is present on the B phase line. Under these circumstances, the amplitude of current component I3B increases significantly relative to its prefault amplitude and relative to the amplitude of each of the other third harmonic current components. The same is true with respect to the third harmonic components I3A, I3B and I3C in FIGS. 3A, 3B and 4A, 4B. The third harmonic current components illustrated in FIGS. 3A and 3B are from a three phase distribution circuit with a transformer bank having a delta primary connection and a delta secondary connection. The third harmonic current components illustrated in FIGS. 4A and 4B are from a three-phase distribution circuit including a transformer having a delta connected primary and an ungrounded wye connected secondary.

The third harmonic current component I3 illustrated in FIG. 1 and the current component I3B illustrated in FIGS. 2B, 3B and 4B illustrate the rather substantial change (e.g. ten to twenty times) in amplitude as a result of a high impedance fault in a three-phase distribution circuit with delta connected loads whether the circuit includes a delta connected primary, a delta connected secondary or both. It is this relationship which provides the basis for detecting high impedance faults in three-phase distribution circuits with delta connected loads in accordance with the present invention, as will be discussed hereinafter. This difference in amplitude results from a high impedance fault. When a ground fault (high impedance fault) occurs, the current follows a new path through a power arc and through the ground, both of which have non-linear resistance. Because of this non-linear characteristic, the fault current contains odd harmonics with a sinusoidal source voltage. The arc current starts to flow when the voltage reaches high enough to start the arc because of the non-linearity of the latter. As the voltage decreases to zero voltage, the current ceases to flow. This non-linear arc current is made of primarily third, fifth and seventh harmonic currents. In addition, there is a time delay (e.g. $\theta_A$) between voltage zero-crossing and the start of arc current (as shown in FIG. 6).

This time delay introduces a phase lag of the third harmonic current contained in the non-linear arc current. Thus, the total third harmonic current during high impedance fault is the vector summation of the prefault third harmonic components and the arc generated third harmonic component. For delta connected circuits, the prefault component is negligibly small compared to the arc-generated third harmonic. Therefore, the total third harmonic current component which is present during a high impedance fault is mostly derived from the arc current and is significantly greater in amplitude than the prefault third harmonic current component. This is best illustrated by means of vector analysis in FIG. 5. This situation should be contrasted with a solidly grounded, wye connected circuit where the prefault third harmonic component and the arc generated third harmonic component are approximately the same so that the resultant third harmonic current component during a fault is not appreciably greater than the prefault current component. This is best illustrated by vector analysis in FIG. 6.

Turning now to FIG. 7, attention is directed to an apparatus 10 which is designed in accordance with the present invention to detect high impedance faults on a three-phase distribution circuit with delta connected load of any of the types referred to above. As seen in FIG. 7, apparatus 10 includes three 180 Hz band pass filters 12A, 12B and 12C which are adapted for connection into the three-phase distribution circuit for receiving the three line currents, IA, IB and IC. Each filter serves to attenuate 60 Hz current components, e.g., the line current and other harmonics with the exception of the third harmonic current component which is amplified. In this way, the only significant output of filter 12A is the third harmonic current component indicated at I3A. In a similar manner, the only significant outputs from filters 12B and 13C are the third harmonic current components I3B and I3C, respectively.

Apparatus 10 also includes three AMPLITUDE INCREASE THRESHOLD detectors 14A, 14B and 14C respectively connected at their inputs to the outputs of band pass filters 12A, 12B and 12C so as to receive third harmonic components I3A, I3B and I3C. Each of the detectors 14 includes internal circuitry for providing a reference signal. This reference signal has an amplitude which is greater than the normal, non-fault amplitude of the received third harmonic current component by a predetermined amount, for example by a factor of five. Each detector also includes internal circuitry for comparing the amplitude of the incoming third harmonic current component to its reference signal for producing an output signal if the amplitude of the incoming third harmonic current component exceeds the reference amplitude, either because of the presence of a high impedance fault or the presence of a transient disturbance. Therefore, should the amplitude of component 13A exceed the reference amplitude of detector 14A, the latter will provide at its output a signal 16A which will remain so long as the amplitude of the 13A signal exceeds the reference level. In a similar manner, detector 14B provides at its output a signal 16B in response to and during the period when the amplitude of the 13B signal exceeds the reference level of detector 14B and 14C produces at its output a signal 16C which is provided in response to and continues so long as the amplitude of the 13C signal exceeds the reference amplitude provided by the circuitry of 14C.

In addition to the foregoing, apparatus 10 includes three time discriminators 18A, 18B and 18C which are respectively connected to the outputs of detectors 14A, 14B and 14C for receiving signal 16A, 16B and 16C if the latter are present. Each of these time discriminators monitors the presence or absence of the incoming signal from its associated detector and produces an output signal if its input signal is continuously present for a predetermined period of time, for example for one or two seconds. In this way the time discriminators discriminate against short term transient increases in the amplitude of the third harmonic current components which might otherwise be mistaken for a high impedance fault. Therefore, the time discriminator 18A will provide an output signal indicated at 20A only if the signal 16A continues for the prescribed period of time. This is equally true for time discriminator 18B and time discriminator 18C which respectively provide output signals 20B and 20C if their input signals continue for the prescribed period.

Finally, as seen in FIG. 7, the outputs of time discriminators 18A, 18B and 18C are connected to the inputs of an OR gate 22 which provides a fault indicating trip signal 24 in response to any one or all of the signals 20. In other words, should there be a high impedance fault on any one of the lines in the distribution circuit being monitored, the amplitude of the third harmonic current component in that line will increase above the threshold or reference amplitude provided by its associated detector. This will cause the latter to produce the signal 16A. If the fault is true, the increased amplitude will remain for the prescribed period set by the time discriminator, e.g., one or two seconds, and the latter will provide an output signal 20, thereby resulting in the production of fault indicating trip signal 24. Should the increase in amplitude actually be the result of a transient disturbance, this change will not generally last the prescribed period and therefore the signal 20 will not be produced and, if no signals 20 are produced, a trip signal 24 will not be provided.

Overall apparatus 10 has been described by means of a block diagram rather than by means of detailed circuitry. This is because individual components making up the apparatus, that is, the pass band filters 12, the AMPLITUDE INCREASE THRESHOLD detectors 14, time discriminators 18 and the OR gate 20 in and by themselves may be readily provided by those with ordinary skill in the art to which the present invention pertains and do not individually form the present invention. The present invention resides in the combination of these readily provided components to function in the manner described for detecting high impedance faults on a three-phase distribution circuit with delta connected loads.

Having described apparatus 10 and the principles of operation upon which it is based, attention is now directed to FIG. 8 which illustrates a circuit simulating a simple three-phase distribution line using small single-phase transformers. This circuit which is self-explanatory includes three 180 Hz band pass filters, e.g., filters 12A, 12B and 12C which provide third harmonic current components from the line currents. Three shunt resistors are inserted at the source (sub-station) to measure three line currents. At the pole transformer location grounded wye (primary) and delta (secondary) connections were made. Three line currents were fed into the three band pass filters and the outputs, e.g., the third harmonic components were recorded, although this has not been shown. The amplitude of each third harmonic current was measured both before and after an arcing fault across one of the phases to ground, thereby simulating a high impedance fault. In the specific example illustrated, the simulated circuit includes a transformer having a grounded wye connected primary and a delta connected secondary. This simulated circuit was also provided with a transformer including a grounded wye connected primary and a grounded wye secondary as well as transformers with an ungrounded wye connected primary and a delta connected secondary, a delta connected primary and a delta connected secondary, and a delta connected primary and ungrounded wye connected secondary. In the simulated circuit including a transformer with a grounded wye connected primary and a grounded wye connected secondary, it was found that there was a phase lag of the third harmonic current during the arcing fault between phase B and ground. This experiment confirms the phase angle change (lag) which is the subject of Applicant's previously recited copending application. The amplitude increase was found to be about two-fold, e.g., not enough to be usable in monitoring for the high impedance fault. Thereafter, the transformer was connected in the manner illustrated in FIG. 8. The prefault amplitude of the third harmonic current component decreased by about 20 db from the level measured during prefault conditions of the grounded wye-grounded wye connection just discussed. However, it increased by 20 to 30 db during the arcing high impedance fault, e.g. from a 0.2 prefault level to a 3.5 fault level. This order of magnitude increase is easily distinguishable from amplitude fluctuation in the system and can be used to identify a high impedance fault as discussed above. In measuring the prefault and fault conditions when the transformer included an ungrounded wye primary connection and a delta secondary connection (e.g. FIG. 2), the amplitude went from a prefault level of 0.2 to a fault level of 3.5. When the transformer was connected to delta for both primary and secondary (e.g. FIG. 3), the third harmonic current component amplitude went from 0.2 prefault level to a 3.8 fault level. Finally, when the transformer was connected to include a delta primary and an ungrounded wye secondary (e.g. FIG. 4), the third harmonic current component amplitude went from a prefault level of 0.3 to a fault level of 4.8.

It is to be understood that the foregoing examples are provided for illustrative purposes only and are not intended to limit the present invention.

What is claimed:

1. A device for use in detecting high impedance faults in a three-phase distribution circuit with delta connected load, said device comprising first means for providing the third harmonic current component from each three phase line current of said distribution circuit, second means connected with said first means for sensing the presence of a predetermined minimum increase in amplitude in each of said third harmonic components, and third means connected with said second means for producing a signal in response to the presence of said increase in any one of said components for a continuous predetermined period of time, said signal indicating a high impedance fault in the line carrying said one component.

2. A device according to claim 1 wherein said first means includes first, second and third band pass filter means adapted for connection with said distribution circuit for providing said third harmonic components.

3. A device according to claim 2 wherein said second means includes first, second and third amplitude increase detectors connected with said first, second and third pass band filter means, respectively, for receiving said third harmonic current component, each of said detectors including means for providing a reference signal having an amplitude greater than the normal, non-fault amplitude of the received current component by an amount approximately equal to said minimum increase and means for producing a threshold signal if and during the time that the amplitude of the received component exceeds said reference signal.

4. A device according to claim 3 wherein said third means includes first, second and third time discriminators connected with said first, second and third amplitude increase detectors, respectively, for receiving said threshold signals if present, each of said time discriminators producing a prefault signal if it receives a threshold signal continuously for said predetermined period, said third means also including gating means for producing said fault indicating signal in response to the presence of at least one of said prefault signals.

5. A device according to claim 4 wherein said predetermined period of time is about one to two seconds.

6. A method of detecting high impedance faults on a three-phase distribution circuit with delta connected load, said method comprising the steps of providing the third harmonic current component from each three-phase line current of said distribution circuit, sensing the presence of a predetermined minimum increase in amplitude in each of said third harmonic components and producing a signal in response to the presence of said increase in any one of said components for a continuous predetermined period of time, said signal indicating a high impedance fault in the line.

* * * * *